United States Patent [19]
Feldblum et al.

[11] Patent Number: 5,412,506
[45] Date of Patent: May 2, 1995

[54] FREE-SPACE OPTICAL INTERCONNECTION ARRANGEMENT

[75] Inventors: Avi Y. Feldblum, Highland Park; Jurgen Jahns, Shrewsbury; Casimir R. Nijander, Lawrenceville; Frank Sauer, Clarksburg; Wesley P. Townsend, Princeton, all of N.J.

[73] Assignee: AT&T Corp., Murray Hill, N.J.

[21] Appl. No.: 848,456

[22] Filed: Mar. 9, 1992

[51] Int. Cl.⁶ .......................... G02B 6/32; G02B 6/34; G02B 5/18; G02F 1/03
[52] U.S. Cl. ................................. 359/569; 359/566; 359/652; 385/33; 385/37
[58] Field of Search .............. 359/558, 565, 566, 567, 359/568, 569, 570, 571, 573, 574, 575, 668, 669, 641, 652, 718, 719, 720, 796, 130, 131, 163; 385/33, 37, 14

[56] References Cited

U.S. PATENT DOCUMENTS

| | | | |
|---|---|---|---|
| 4,362,359 | 12/1982 | Dammann et al. | 385/33 X |
| 4,626,069 | 12/1986 | Dammann et al. | 359/359 |
| 4,715,027 | 12/1987 | Mahapatra et al. | 359/130 |
| 4,838,645 | 6/1989 | Mächler et al. | 359/572 X |
| 4,895,790 | 1/1990 | Swanson et al. | 430/321 |
| 4,946,253 | 8/1990 | Kostuck | 359/15 |
| 5,071,232 | 12/1991 | Kato et al. | 359/315 |
| 5,113,286 | 5/1992 | Morrison | 359/569 |
| 5,148,317 | 9/1992 | Foresi | 359/566 |
| 5,182,780 | 1/1993 | Robertson | 385/14 |

FOREIGN PATENT DOCUMENTS

| | | | |
|---|---|---|---|
| 2454633 | 11/1980 | France | G02B 7/26 |
| 0199301 | 8/1988 | Japan | 359/566 |
| 0178230 | 8/1991 | Japan | 359/163 |
| WO91/12551 | 8/1991 | WIPO | G02B 27/44 |

OTHER PUBLICATIONS

"Holographic tandem arrays," H. Kobolla, F. Sauer & R. Volkel, Proc. SPIE, vol. 1136 (1989).
"Optical cyclic shifter using diffractive lenslet arrays," J. Jahns and W. Daschner, Opt. Comm., vol. 79, No. 6 15 Nov. 1990 p. 407.
"Microcavity GaAAs/GaAs surface emitting lasers w/1th=6mA," K. Iga, S. Kinoshita, and F. Koyama, Electron. Lett. vol. 23, No. 3 29 Jan. 1987 p. 134.
"Low-threshold electrically pumped vertical-cavity surface emitting microlasers," J. L. Jewell, et al., Electron Lett.; vol. 25, No. 17 17th Aug. 1989 p. 1123.
"Microlenses for coupling junction lasers to optical fibers," L. G. Cohen, et al., Appl. Opt., vol. 13, No. 1 Jan. 1974 89.
"Technique for monolithic fabrication of microlens arrays," Z. D. Popovic, et al., Appl. Opt. vol. 27, No. 7, 1 Apr. 1988 1281.
"A distributed planar microlens made of plastics," M. Oikawa, et al., Jpn J. Appl. Phys. vol. 20, No. 1, Jan. 1981 L51.
"Array of Distributed planar microlens prepared from ion exchange technique," M. Oikawa, et al., Jpn. J. Appl. Phys. vol. 20, No. 4 Apr., 1981 L296.
"Distributed-Index Planar Microlens," M. Oikawa, et al., Appl. Opt.; vol. 21, No. 6 15 Mar. 1982 p. 1052.
"Two-dimensional array of diffractive microlenses fabricated by thin-film deposition,", J. Jahns, et al., Appl. Opt.; vol. 29, No. 7, 1 Mar. 1990 p. 931.
"Micro Fresnel lenses," H. Nishihara, et al., Progress in Optics; vol. 24, (1987) pp. 3–37.
"Binary Optics Technology: the Theory and Design of Multi-level Diffractive Optical Elements,", G. J. Swanson, NTIS Publ. No. AD-A213-404 (1989).

(List continued on next page.)

Primary Examiner—William L. Sikes
Assistant Examiner—David R. Parsons
Attorney, Agent, or Firm—John A. Caccuro

[57] ABSTRACT

A diffractive and a refractive microlens component are combined into a doublet lens to obtain imaging properties that are improvements over those achievable using separate components. In one application, diffractive/refractive microlens arrays are arranged to provide a free-space optical permutation interconnect arrangement.

23 Claims, 2 Drawing Sheets

OTHER PUBLICATIONS

U. Killat et al., "Optical Method for the Detection for Bit Sequences," EOC 1980, York, United Kingdom, 16–19 Sep. 1980, Proceedings ECOC 1980, pp. 16–19.

J. Schwider, et al., "Space-Variant Holographic Optical Elements for Switching Networks and General Interconnects", Physikalisches Institut, Universitat Erlangen–Nurnberg, Lehrstuhl Prof. Lohmann, Staudtstrasse 7, D-8520 Erlangen, Federal Republic of Germany; Photonic Switching, pp. 190–199.

B. Robertson, et al., "Space-variant holographic optical elements in dichromated gelatin," Applied Optics, vol. 30, 1991, pp. 2368–2375.

J. Upatnieks, et al., "Correction of Lens Aberrations by Means of Holograms," Applied Optics, vol. 5, No. 4, Apr. 1966, pp. 589–593.

T. Stone, et al., "Hybrid diffractive-refractive lenses and achromats", Applied Optics, vol. 27, No. 14, Jul. 1988, pp. 2960–2971.

"ReDiMax Diamond-Turned Refractive/Diffractive Optics," Photonics Spectra, May 1991, p. 110.

FREE-SPACE OPTICAL INTERCONNECTION ARRANGEMENT

TECHNICAL FIELD

This invention relates to free-space optics and, more particularly, to a free-space optical interconnection arrangement which uses elements having both diffractive and refractive surfaces.

BACKGROUND OF THE INVENTION

Photonics is the technology involved in communicating with light. It includes fiber optic technology (transmitting information as pulses of light though ultrapure glass fibers) as well as free-space optics (sending light signals through free-space, e.g., air). In telecommunication systems, fiber optics has now become the transmission medium of choice. A variety of optical switching systems is rapidly being developed to switch light signals between optical fibers. One type of optical switching arrangement is a fiber optic patch panel which is used m provide an arbitrary but fixed interconnection between two ordered arrays of optical fibers. In the prior art, there am three basic approaches to the implementation of a fiber optic patch panel.

First, one may use an optical fiber patch cord to interconnect the light signals from an input fiber array to an output fiber array. The fibers of such an interconnecting fiber patch cord being used to establish the desired interconnect pattern. This solution may be practical for the interconnection of small numbers of fibers. When many fibers, e.g., on the order of several hunted, have to be interconnected, thee arrangement and connectorization of the corresponding large interconnection bundle may become more impractical and difficult than other solutions.

Second, one may use waveguides, e.g., Lithium Niobate ( LiNbO$_3$) couplers, to interconnect one-dimensional (1-D) fiber arrays. To implement a certain interconnect pattern, one has to lay out a corresponding routing pattern and transfer it to a wafer for the coupler waveguide fabrication. Again, this way of interconnecting fiber arrays is only practical if the number of fibers in the array is not too large. This is because the coupler waveguides cannot be densely spaced in the lateral direction, which results in increasing the longitudinal dimension to enable the couplers to perform the desired interconnect permutation. Since an interconnection chip is limited to the size of a wafer (several inches), the interconnection of several hundred fibers in one wafer does not seem feasible.

Third, one can send the light beams through free-space. Every input light beam is then deflected towards its desired output location. On their way, the light beams cross through each other in space without influencing each other. The free-space concept is naturally well suited for the interconnection of 2-D arrays and hence for the interconnection of a large number of fibers. Furthermore, the price of the main optical system does not increase as rapidly with the number of fibers as does the optical fiber patch cord solution.

A free-space, fiber optic patch panel (optical permutation interconnect arrangement) requires an input element to collimate and deflect the light signals from each input fiber and output element to deflect and focus the light signal for each output fiber.

One known free-space switching technique involves the use of small lenses (lenslets) in an off-axis configuration to perform both the collimate/focus and deflection functions. Unfortunately, the larger the deflection angle required, the more off-axis/off-center a lenslet has to be used. This requires lenslets of larger numerical apertures (a larger diameter for a given focal length).

For refractive lenslets, see FIG. 1, aberrations become more severe with higher apertures. Additionally, there is a waste of space because fabrication methods only allow one to put whole lenslets into an array instead of just the lens section(s) one really needs to use.

For diffractive lenslets (lithographically produced), see FIG. 2, the light efficiency goes down with higher numerical apertures due to limited resolution of the grating fabrication process. A higher numerical aperture means a smaller grating period at the edge of the lens. Given a minimum feature size, one may not be able to further subdivide the basic grating period in order to implement multilevel phase gratings needed for good light efficiency. Thus, there is a tradeoff between high aperture and high light efficiency. A further problem with the single off-axis diffractive lenslets is the strong wavelength dependence of both the focal length and the deflection angle.

For holographic lenslets (interferometrically produced diffractive lenslets), there is no problem with the light efficiency at large deflection angles (rather at small deflection angles), but the technology (recording materials and processing) is not yet (and may never be) mature enough to provide the required precision. Also, the holographic lenslets show the same strong wavelength dependence as the lithographically produced diffractive lenslets.

Optical interconnect arrangements have utilized singlet lenses which perform only the deflection task, excluding the collimation/focusing task. Prior art holographic singlet arrangements are described in H. Kobolla, F. Sauer and R. Völkel, "Holographic tandem arrays", *Proc. SPIE*, 1136 (1989) and B. Robertson, E. J. Restall, M. R. Taghizadeh, and A. C. Walker, "Space-variant holographic optical elements in dichromated gelatin," *Appl. Opt.*, (1991) 2368. Diffractive singlet arrangements of the binary optics type performing both collimation/focusing and deflection tasks are described in J. Jahns and W.Däschner, "Optical cyclic shifter using diffractive lenslet arrays," *Opt. Comm.*, 79 (1990) 407. The article entitled "Space-variant holographic optical elements for switching networks and general interconnects," by J. Schwider, W. Stork, N. Streibl, and R. Völkel, *OSA Proceed. on Photonic Switching*, Vol. 8, March 1991, pages 190–195, describes free-space optical permutation interconnect arrangements. One disclosed arrangement proposes a doublet made of two separate diffractive singlets to perform the collimation/focusing and deflection tasks. Undesirably, as previously noted, the pure holographic diffractive element solution exhibits strong wavelength dependence. Moreover, holographic technology does not now and may never provide the required precision needed for optical interconnect arrangements.

Thus, there is a continuing need to further improve the implementation of optical interconnect arrangements.

SUMMARY OF THE INVENTION

In accordance with the present invention, an optical lens structure comprises a first refractive means for substantially collimating light rays impinging on a first surface of the structure and a diffraction means located on a second surface of the structure for deflecting the collimated light rays at a predetermined angle to said second surface. We refer to such an optical lens structure as a refractive-diffractive doublet (hereinafter doublet). Advantageously, our doublet is less wavelength sensitive than using purely diffractive elements for performing the combined task of collimation/focusing and deflection. When a plurality of refractive-diffractive doublet lenses are arrayed on an integrated monolithic lens array and paired with a matched second monolith lens array, the resulting structure provides a free-space optical interconnect arrangement. Such an arrangement may, illustratively, provide a fixed arbitrary interconnection between two optical fiber arrays (i.e., a fiber optical patch panel), between an array of microlasers and an array of optical detectors, or, more generally, between optical signal sources and destinations.

Refractive-diffractive optical components have been proposed in the field of lens design. However, the idea of such components is to use the diffractive gratings to improve the collimation and focusing performance of refractive lenses by compensating for spherical or chromatic aberrations. Illustrative examples of such use is described in J. Upatnieks, A. Vander Lugt, and E. Leith, "Correction of lens aberrations by means of holograms," *Appl. Opt.* 5, (1966) 589, Th. Stone and N. George, "Hybrid diffractive-reflective lenses and achromats," *Appl. Opt.* 27, (1988) 2961 and "ReDiMax Diamond Turned Refractive/Diffractive Optics," *Photonics Spectra*, May 1991, page 110. Undesirably, however, such lenses would either have to be used in an off-axis configuration to provide deflection or, when used in an on-axis configuration, would require another lens to provide deflection.

DETAILED DESCRIPTION

In the following description, each item or block of each figure has a reference designation associated therewith, the first number of which refers to the figure in which that item is first located (e.g., 301 is located in FIG. 3).

Figure 3:
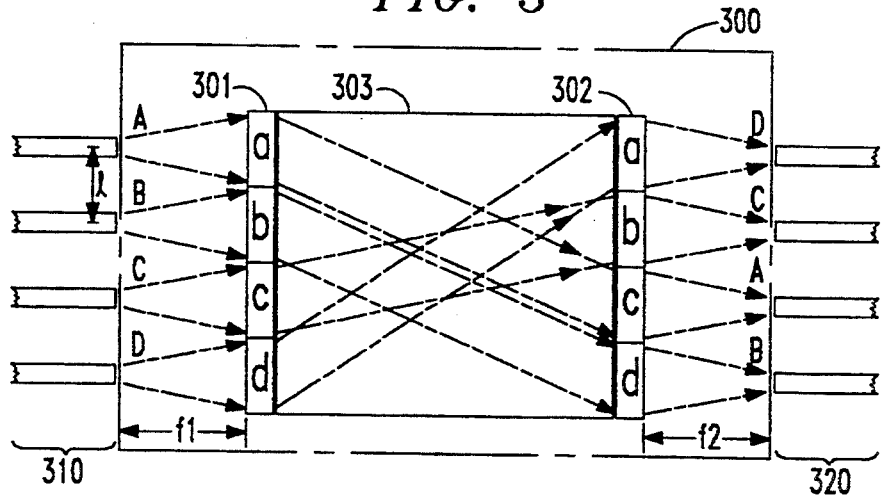
FIG. 3 shows a one-dimensional free-space fiber optic patch panel implemented using an array of our refractive-diffractive doublet lenses.

FIG. 3 shows the operating principle of an illustrative, one-dimensional free-space fiber optic patch panel. The free-space optical system 300 couples the light beams A-D from source fiber array 310 to the destination fiber array 320, in a predetermined and fixed interconnect pattern. Illustratively, the optical system 300 consists of an input component (substrate) 301 a spacer 303 and an output component 302.

Spacer 303, has a predetermined thickness and may be made of quartz, silicon or other suitable material transparent at the wavelength of interest. The component 301, spacer 303 and component 302 can be assembled into a monolithic arrangement. Illustratively, this may be done by gluing, in a well-known manner, the components 301 and 302 to spacer 303 so as to ensure a precise alignment. Other well-known mounting techniques may also be used to hold components 301 and 302 precisely aligned relative to each other and to fiber arrays 310 and 320.

Components 301 and 302 are matched lenslet arrays which collimate, deflect and focus the light beams A, B, C, D to accomplish the desired interconnect pattern between the fiber arrays 310 and 320. Components 301 and 302 each, illustratively, include four refractive-diffractive doublet lenses a, b, c and d. Doublet lenses in component 301 collimate the divergent light beams coming out of the single source fibers of fiber array 310 and deflect the light beams individually (A, B, C. D), towards the doublet lenses of component 302 corresponding to destination fibers of fiber array 320. Doublet lenses of component 302 redirect the light beams into the common output direction and also focus the light beams to couple them into the destination of fiber array 320.

The lateral spacing l of the lenslets matches the spacing of the light sources 310 in the input fiber array 310. Component 301 is positioned approximately one focal length $f_1$ away from the input fiber array 310 and each lenslet is centered relative to a light source so that it substantially collimates (hereinafter collimates) the light wave emerging from that source and sends it to a corresponding lenslet in component 302. Similarly, component 302 is positioned one focal length $f_2$ away from the output fiber array 320. Note, the focal length of the lenslets of component 301 and 302 can be different or the same depending on the particular application. As compared to a system implemented using FIGS. 1 and 2, the lenslet approach has the advantage that the individual lenslets used in the array can be fairly simple lenses since they are not required to work over a finite field. Moreover, since the propagation distance between component 301 and 302 is limited to short distances, little crosstalk occurs between the light beams A-D.

Figure 4:
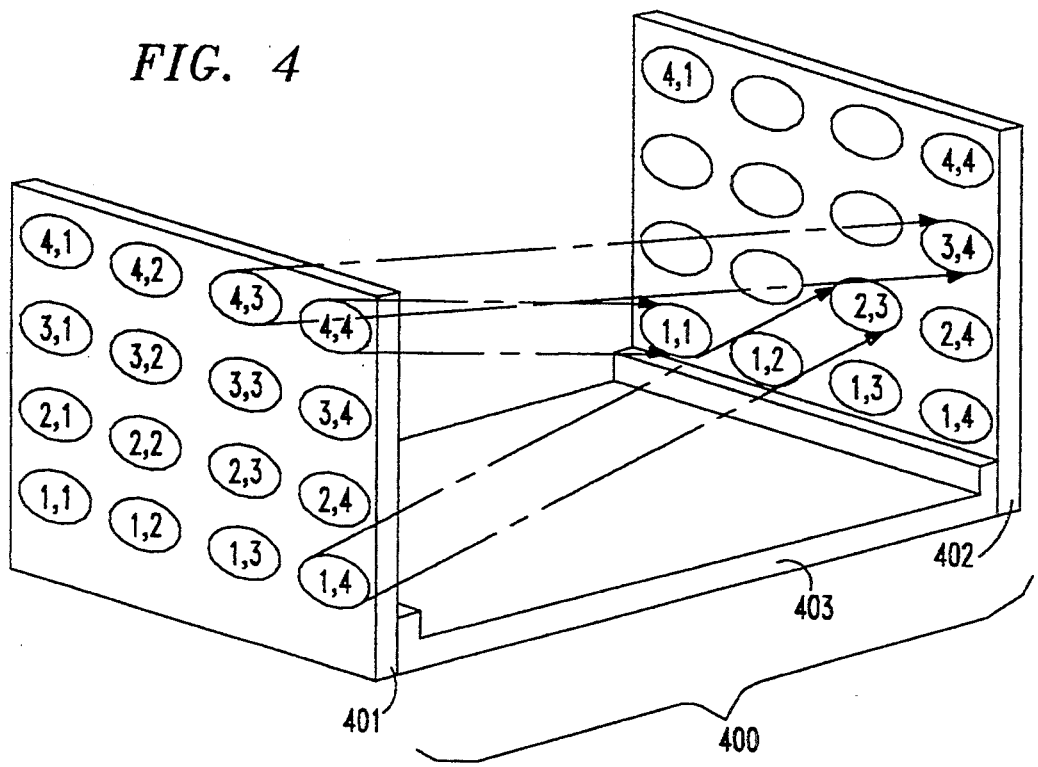
FIG. 4 shows a two-dimensional patch panel in accordance with the present invention.

Shown in FIG. 4 is an illustrative, two-dimensional (2-D) free-space fiber optic patch panel 400. The 2-D patch panel consists of an input component 401, spacer bracket 403 and an output component 402. The illustrative spacer bracket 403 is glued to components 401 and 402 to hold them in a precise alignment relative to each other and to fiber array 310 and 320. Obviously, the previously described spacer 303 or other arrangements may be utilized for this function. Each of the components 401 and 402 are shown to include a four-by-four array of refractive-diffractive doublet lenses (1, 1–4, 4). For clarity, the source fiber array and destination fiber array which couple light beams to patch panel 400 are not shown.

By way of example, patch panel 400 depicts light beams originating at doublet lenses 1, 4; 4, 3 and 4, 4 of component 401 being directed to doublet lens 2, 3; 3, 4 and 1, 1, respectively, of component 402.

While the optical interconnect arrangements shown in FIGS. 3 and 4 were described as a fiber optic patch panel, they need not just optically interconnect fiber arrays. The inputs and outputs of the arrangements could, as well, be freespace coupled to other light beam sources and destinations. For example, the light beams may come from an array of microlasers or other lens system and the optical destination may be an array of optical detectors or another lens system.

Thus, one could use such a passive optical interconnect system to interconnect active devices. The inputs to the optical interconnect system could come, illustratively, from an array of microlasers as described in K. Iga, S. Kinoshita, and F. Koyame, "Microcavity GaAAs/GaAs surface emitting lasers with 1th=6 mA," *Electron. Len.* 23, (1987) 134 and as described in J. L. Jewell, A. Scherer, S. L. McCall, Y. H. Lee, S. Walker, J. P. Harbison, and L. T. Florez, "Low-threshold electrically pumped vertical-cavity surface-emitting microlasers," *Electron. Lett.* 25, (1989) 1123. The output of the optical interconnect system can then be coupled to an array of detectors.

Figure 5:
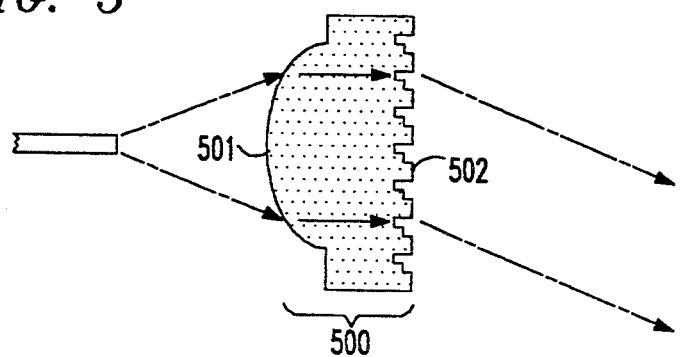
FIG. 5 shows a first embodiment of our doublet lens having a refractive lens and diffractive grating on opposite sides of one substrate.
Figure 6:
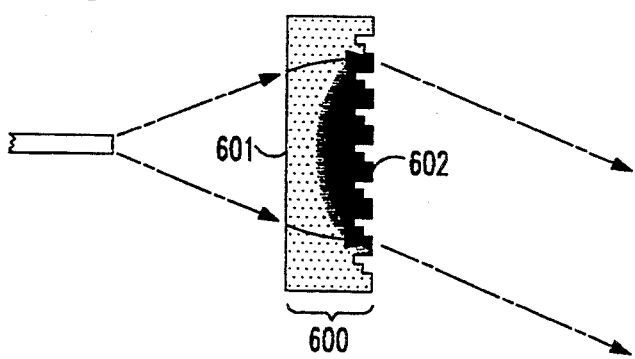
FIG. 6 shows a second embodiment of our doublet lens having a refractive lens and diffractive grating on the same side of one substrate.

The optical interconnect arrangements of FIGS. 3 and 4 may be implemented as follows. The task of the doublet lenses of input component (substrate) 301 is split into two subtasks, namely the subtask of collimation and the subtask of deflection. With reference to FIGS. 5 and 6, there are illustrated representative doublet lenses implemented on an optical substrate (500 and 600, respectively). The subtask of collimation is performed using a refractive lens which is fabricated e.g., by the technique of photoresist melting (for curved surface lens 501) or by the technique of ion exchange (for gradient-index lens 601). Refractive microlenses made using these techniques can be made with high numerical aperture, however, there are limitations in size and in field angle.

Illustratively, for the fabrication of curved surface lenses (e.g., quasi-spherical), small cylinders of photoresist are heated until they melt and form droplets. The droplet shape is then transferred into the underlying substrate (illustratively, made of quartz) by using a dry etching technique. The substrate may also be made from silicon, especially for use with long wavelength light beams (such as 1.3 $\mu$m or 1.5 $\mu$m). Refractive lenslets can be made with high numerical apertures and at the same time high efficiencies. Furthermore, it is not difficult to coat the smooth refractive lens surface with an anti-reflection coating in order to prevent back-reflections from the lens surfaces to the light sources. On the other hand, fabrication tolerances that can occur with the fabrication of refractive lenses have usually only a small effect on the performance of the collimation operation.

Well-known ways for fabricating a refractive lenslet array using photo resist melting is described in more detail in L. G. Cohen and M. V. Schneider, "Microlenses for coupling junction lasers to optical fibers," *Appl Opt.* 13, (1974) 89 and Z. D. Popovic, R. A. Sprague and G. A. N. Connell, "Technique for monolithic fabrication of microlens arrays," *Appl. Opt.* 27, (1988) 1281, which are incorporated herein by reference.

Fabrication of a gradient-index refractive lenslet array using ion exchange is described in the following references: M. Oikawa, K. Iga, and T. Sanada, "A distributed planar microlens made of plastics," *Jpn. J. Appl. Phys.* 20,(1981) L51; M. Oikawa, K. Iga and T. Sanada, "Distributed planar microlens prepared from ion exchange technique," *Jpn, J. Appl. Phys.* 20, (1981) L296 and M. Oikawa and K. Iga, "Distributed-Index Planar Microlens," *Appl. Opt.* 21, (1982) 1052, which are also incorporated by reference herein.

The subtask of deflection in the doublet lenses of FIGS. 5 and 6 is performed with an array of gratings, i.e., diffractive elements 502 and 602, preferentially of the 'binary optics' type. Illustratively, known methods for fabricating an array of gratings are described in the references G. J. Swanson, "Binary optics technology: the theory and design of multi-level diffractive optical elements," MIT Lincoln Laboratory, 14 Aug. 1989, *NTIS* Publ. No. AD-A213-404, (1989) and J. Jahns and S. J. Walker, "Two-dimensional array of diffractive microlenses fabricated by thin-film deposition," *Appl. Opt.* 29, (1990) 931 which are incorporated by reference herein.

Alternatively, the diffractive elements, 502 and 602, may be formed by direct electron beam lithography as described in the reference "Micro Fresnel lenses" by H. Nishihara and T. Suhara, *Progress in Optics* 24, (1987) 3–37.

As the above-identified fabrication techniques are all based on photolithography, it is straightforward to place the refractive and the diffractive array onto the same substrate, creating a monolithic refractive-diffractive component for use in FIGS. 3 or 4.

FIG. 5 shows as an example a doublet consisting of a refractive lens 501 of quasi-spherical shape and a diffraction grating 502. In the arrangement of FIG. 5, the refractive and diffractive elements can be on opposite sides of the substrate. The refractive and diffractive elements can also be placed on the same side of the substrate. FIG. 6 shows as an example a possible combination of a planar (gradient-index) refractive microlens 601 with a diffraction grating 602. In another embodiment, refractive and diffractive elements are placed onto different substrates, which have to be assembled together.

Either of the doublet fabrication techniques shown by 500 of FIG. 5 or 600 of FIG. 6 may be utilized to implement each of the lenses and of component 301 and 302 of FIG. 3 or each of the lenses 1, 1 through 4, 4 of component 401 and 402 of FIG. 4. The photolithographic fabrication techniques allow the fabrication of a monolithic array of such doublet lenses onto a substrate.

FIGS. 5 and 6 illustrate the implementation of an input doublet lens (e.g., 301 or 401) to provide a refractive-diffractive orientation from left to right. An output doublet lens (e.g., 302 or 402) requires a diffractive-refractive orientation from left to right (a left-to-fight reversal of that shown in FIGS. 5 and 6). In such a reverse orientation the light beams are first deflected by the diffraction gratings (502 or 602, respectively) and then focused by the refractive element (501 or 601, respectively). Thus, the lenslets of output components (302 and 402) are also implemented as refractive-diffractive doublets like the lenslets of input components (301 and 401).

Figure 1:
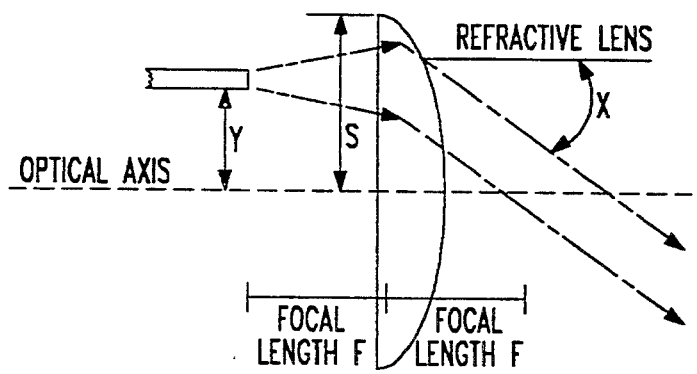
FIG. 1 shows a prior art refractive lens used in an off-axis/off-center configuration to perform both the collimate/focus and deflection functions.
Figure 2:
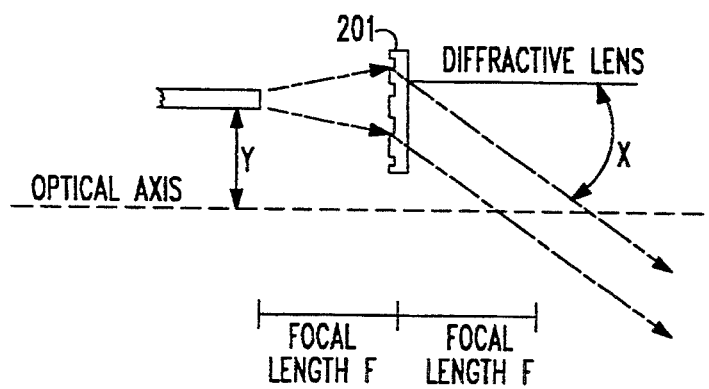
FIG. 2 shows a prior art diffractive lens used in an off-axis/off-center configuration to perform both the collimate/focus and deflection functions.

With joint reference to FIGS. 1 and 2, we describe in more detail the advantages of the doublet lenslets of the present invention over the use of a singlet lens to provide the tasks of input or output components of FIGS. 3 and 4. A singlet lens, refractive (FIG. 1) or diffractive (FIG. 2) in an off-axis configuration performs the tasks of collimation and deflection at the same time required by an input component (301 or 401). Similarly, such a refractive or diffractive singlet lens, in a reverse configuration, performs the tasks of deflection and focusing required by an output component (302 or 402).

However, severe limitations to the use of singlet lenses exist. The larger the deflection angles, X, the more off-axis, Y, the lenses have to be used. This requires lenses of larger and larger numerical apertures (larger and larger diameters for a given focal length F).

For refractive lenslets, aberrations become more and more severe with higher apertures and with greater off-axis use. Additionally, there is a waste of space because the fabrication methods only allow one to put whole lenslets into an array instead of just the lens sections one really wants to use.

For diffractive lenslets of the binary optics type, the light efficiency goes down with higher numerical apertures due to limited resolution of the fabrication process. A higher numerical aperture means a smaller grating period at the edge of the lens. Given a minimum feature size, one may not be able to further subdivide the basic grating period in order to implement multilevel phase steps. Only multilevel phase gratings, however, have a good light efficiency, so there is a tradeoff between high aperture and high light efficiency. In a sense, the incorporation of focal power into a deflecting grating constitutes a waste of resolution of the fabrication process because its maximum resolution can only be used over a small section of the whole element. A further problem with the single off-axis diffractive lenslets is the strong wavelength dependence of both the focal length and the deflection angle. This wavelength dependence becomes a problem due to the fact that commercial diode lasers used for communication are not precisely specified in their wavelength. A typical laser may have a wavelength in the range of 1300±20 nm (or in the range of 1500±20 nm). The diffractive singlet system would not work with every laser out of such a variety. This either demands a costly wavelength pre-selection of the laser diodes or a costly customizing of the system to the specific laser diode in use.

For holographic lenslets, there is no problem with the light efficiency at large deflection angles but only at small deflection angles. However, existing technology is not sophisticated enough to provide the required precision of the holographic lenslets. Additionally, holographic lenslets show the same strong wavelength dependence as the lithographically produced diffractive lenslets.

Thus, in the singlet solution, the numerical aperture of the lenses would have to be partially used for collimation/focusing and partially for the beam deflection. High numerical apertures, however, are difficult to achieve. The main problem with refractive lenslets is the aberration occurring in the off-axis/off-center configuration. The fundamental problem with diffractive lenses, even if one would be able to run the required high resolution lithography, is still the strong chromatic aberration of such a system. A singlet lens solution to provide both collimation/focusing and deflection tasks seems not to be practical. Our doublet solution, however, relaxes the demands on the single elements and makes the implementation of a free-space fiber optic patch panel feasible.

Advantageously, our refractive/diffractive doublet lens splits the whole task into subtasks one can perform with elements which are especially well suited for each subtask. Refractive lenslets are especially well suited for the collimation/focusing task. They can be easily fabricated with the numerical apertures required and work then nearly diffraction limited in the on-axis configuration. They show only negligible chromatic aberration over the considered wavelength interval of 40 nm. Diffraction gratings, on the other hand, are the only feasible implementation of providing the deflection task. There is no fabrication technique for a corresponding refractive microprism array.

The gratings of the diffractive section may be fabricated using a binary grating as shown by 201 of FIG. 2 or by using a multiple grading 602 of FIG. 6.

According to another aspect of the present invention, if necessary, a bit of focal power may be added to the diffractive gratings to additionally compensate for aberrations of the refractive lenslets, e.g., spherical aberration or chromatic aberration. The main pan of the collimation and focusing subtasks, however, would still be performed by the refractive lenslets.

Furthermore, as previously described, the monolithic fabrication of input and output components using refractive/diffractive doublets is easily implemented, because both refractive lenslets and gratings can be fabricated by lithography.

What has been described is merely illustrative of the application of the principles of the present invention. Other arrangements can be implemented by those skilled in the art without departing from the spirit and scope of the present invention.

We claim:

1. A single substrate monolithic optical structure comprising
    a plurality of optical microlenses formed on surfaces of said monolithic structure, at least one microlens including
    refractive means located on a first surface of said structure for substantially collimating light rays impinging on said first surface of said structure and
    diffractive means located on a second surface of said structure for deflecting said substantially collimated light rays at a predetermined angle to said second surface.

2. The structure of claim 1 wherein said refractive means is a convex refractive surface formed on said first surface.

3. The structure of claim 2 wherein said convex surface is a substantially spherical surface.

4. The structure of claim 2 wherein said convex surface is a photo-resist droplet lens.

5. An optical signal interconnection structure for interconnecting a plurality of external light sources with a plurality of external light destinations, said arrangement comprising
    a first monolithic optical structure containing a plurality of optical microlenses, at least one microlens including
    refractive means located on a first surface of said structure for collimating substantially light rays received from one of said plurality of light sources on said first surface and
    diffractive means located on a second surface of said first structure for deflecting said collimated light rays at a predetermined angle to said second surface; and
    a second monolithic optical structure having a predetermined free-space alignment to said first structure and containing a plurality of optical microlenses, at least one microlens including diffractive means located on a first surface of said second structure for receiving said deflected collimated light rays and refractive means for focusing said received collimated light rays on one of said plurality of light destinations.

6. The arrangement of claim 5 wherein at least one of said refractive means is a convex refractive surface formed in said first surface.

7. The arrangement of claim 6 wherein said convex surface is a substantially spherical surface.

8. The arrangement of claim 6 wherein said convex surface is a photo-resist droplet lens.

9. A single substrate monolithic optical structure comprising a plurality of optical microlenses formed on surfaces of said monolithic structure, at least one microlens including refractive means located between a first and a second surface of said structure for substantially collimating light rays impinging on said first surface of said structure and diffractive means located on said second surface of said structure for deflecting said substantially collimated light rays at a predetermined angle to said second structure.

10. The structure of claim 9 wherein said refractive means is a planar gradient-index lens in said optical structure in front of said diffractive grating means.

11. The structure of claim 10 wherein said planar gradient-index is an ion exchange formed lens.

12. An optical interconnection structure for interconnecting a plurality of external light sources with a plurality of external light destinations, said arrangement comprising a first monolithic optical structure containing a plurality of optical microlenses, at least one microlens including refractive means located between a first and a second surface of said structure for collimating substantially light rays received from one of said plurality of light sources on said first surface and diffractive means located on said second surface of said first structure for deflecting said collimated light rays at a predetermined angle to said second surface; and a second monolithic optical structure having a predetermined free-space alignment to said first structure and containing a plurality of optical microlenses, at least one microlens including diffractive means located on a first surface of said second structure for receiving said deflected collimated light rays and refractive means for focusing said received collimated light rays on one of said plurality of light destinations.

13. The arrangement of claim 12 wherein at least one of said refractive means is a planar gradient-index lens adjacent said diffractive grating means.

14. The arrangement of claim 13 wherein said planar gradient-index is an ion exchange formed lens.

15. The structure of claims 1 or 9 wherein said diffractive means is a binary optics type grating.

16. The structure of claims 1 or 9 wherein said diffractive means is a thin-film deposited lens on said second surface.

17. The structure of claims 1 or 9 wherein said diffractive means is a lens formed by direct electron beam lithography.

18. The arrangement of claims 5 or 12 wherein at least one of said diffractive means is a binary optics type grating.

19. The arrangement of claims 5 or 12 wherein at least one of said diffractive means is a thin-film deposited lens on said second surface.

20. The arrangement of claims 5 or 12 wherein at least one of said diffractive means is a lens formed by direct electron beam lithography.

21. The arrangement of claims 5 or 12 further including an optically transparent spacer for holding said first and second structures in precise alignment.

22. The arrangement of claim 21 wherein said first and second structures are glued to said spacer.

23. The arrangement of claims 5 or 12 further including a spacer bracket for holding said first and second structure in precise alignment.

* * * * *